United States Patent
Lipe et al.

(10) Patent No.: US 7,099,886 B2
(45) Date of Patent: Aug. 29, 2006

(54) METHOD AND APPARATUS FOR IDENTIFYING PROGRAMMING OBJECT ATTRIBUTES

(75) Inventors: Ralph Lipe, Clyde Hill, WA (US); Robert L. Chambers, Sammamish, WA (US); Edward W. Connell, Redmond, WA (US); Abhijit Sarkar, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 09/871,550

(22) Filed: May 31, 2001

(65) Prior Publication Data

US 2002/0010809 A1 Jan. 24, 2002

Related U.S. Application Data

(60) Provisional application No. 60/219,861, filed on Jul. 20, 2000.

(51) Int. Cl.
G06F 17/30 (2006.01)

(52) U.S. Cl. .................. 707/103 R; 707/101; 707/102; 707/104.1

(58) Field of Classification Search .................. 707/3, 707/5, 6, 103, 10, 101, 102, 103 R, 104.1; 717/113, 128; 712/234; 709/219; 710/1; 705/50

See application file for complete search history.

(56) References Cited

U.S. PATENT DOCUMENTS

| | | | | |
|---|---|---|---|---|
| 5,455,949 A | * | 10/1995 | Conder et al. .............. | 712/234 |
| 6,032,145 A | * | 2/2000 | Beall et al. .................... | 707/5 |
| 6,105,023 A | * | 8/2000 | Callan .......................... | 707/5 |
| 6,134,559 A | * | 10/2000 | Brumme et al. ........ | 707/103 R |
| 6,144,958 A | * | 11/2000 | Ortega et al. .................. | 707/5 |
| 6,189,012 B1 | * | 2/2001 | Mital et al. ............. | 707/103 R |
| 6,269,475 B1 | * | 7/2001 | Farrell et al. ................ | 717/113 |
| 6,278,996 B1 | * | 8/2001 | Richardson et al. ........... | 707/6 |
| 6,336,137 B1 | * | 1/2002 | Lee et al. .................... | 709/219 |
| 6,405,264 B1 | * | 6/2002 | Jindal et al. ................ | 719/316 |
| 6,449,660 B1 | * | 9/2002 | Berg et al. ...................... | 710/1 |
| 6,484,276 B1 | * | 11/2002 | Singh et al. .................. | 714/41 |
| 6,658,652 B1 | * | 12/2003 | Alexander et al. .......... | 717/128 |
| 6,957,228 B1 | * | 10/2005 | Graser .................... | 707/103 R |
| 2003/0120600 A1 | * | 6/2003 | Gurevich ..................... | 705/50 |

OTHER PUBLICATIONS

Chen et al., "Centralized content-based Web filtering and blocking: How far it can go?", IEEE, 1999, pp. 115-119.*
J. Petro et al. "Model-Based Reuse Repositories-Concepts and Experience," Proceedings Seventh International Workshop on Computer-Aided Software Engineering (Cat. No. 95CB35827), pp. 60-69 (Jul. 10-14, 1995).
A. Tarlecki et al., "Some Fundamental Algebraic Tools for the Semantics of Computation. 3. Indexed Categories," *Theoretical Computer Science*, vol. 91, No. 2, pp. 239-264 (Dec. 23, 1991).

(Continued)

*Primary Examiner*—Thuy N. Pardo
(74) *Attorney, Agent, or Firm*—Theodore M. Magee; Westman, Champlin & Kelly, P.A.

(57) ABSTRACT

The present invention provides a method and computer-readable medium for searching for programming objects on a computer system. Under one aspect of the invention, optional search attributes are used to order a list of references to found programming objects. Under a second aspect of the invention, object attributes that are stored outside of a static attribute storage area are inspected during the search for programming objects. Under a third aspect of the invention, different sets of object data are allowed to reference the same programming object class, and different objects of a single programming object class may be initialized in different ways so that they exhibit different attributes.

12 Claims, 13 Drawing Sheets

OTHER PUBLICATIONS

Microsoft Software Developers Network (MSDN) "Component Categories Manage Implementation," 13 pages (2000).

Application 09/871,550 filed May 31, 2001—Response: Aug. 1, 2005; Sep. 1, 2005.

* cited by examiner

METHOD AND APPARATUS FOR IDENTIFYING PROGRAMMING OBJECT ATTRIBUTES

REFERENCE TO RELATED APPLICATION

This application claims priority from a U.S. Provisional Application having Ser. No. 60/219,861, filed on Jul. 20, 2000 and entitled "MICROSOFT SPEECH SDK (SAPI 5.0)".

BACKGROUND OF THE INVENTION

The present invention relates to object-oriented programming. In particular, the present invention relates to identifying attributes of programming objects.

In object-oriented programming, an object is a set of programming instructions that supports one or more methods and/or has one or more properties. A method in an object can be called by instantiating the object (loading the object into memory) and then making a call to the method exposed by the object. A property of an object can be set by instantiating the object and then setting the property.

In some programming environments, multiple objects may expose the same method but may work in different ways. At times, these differences can be significant and an application that wants to invoke the method may want to know how the object will behave before it instantiates the object.

To allow for this, some object-oriented systems provide lists of attributes for objects that have been registered with the system. In particular, the Component Object Model (COM) uses a technique known as Component Categories to maintain a list of object attributes in the local registry. This list can be queried before a COM object is instantiated to determine if the object meets a set of attributes.

Although the Component Categories technique is useful, it has several limitations. First, it relies on the attributes being statically present on a local computer. As a result, COM objects must have their attributes stored on each local machine, resulting in redundant sets of data. In addition, object classes that are made available dynamically or that have their attributes stored outside the local machine cannot be found using component categories.

Second, when searching Component Categories, it is difficult to find objects with desirable but not mandatory attributes. Under Component Categories, each of the search criteria is considered mandatory. If an object does not meet the search criteria, it is not returned. Thus, optional criteria cannot be placed in a first search for objects.

Because of this, an object or application performing a search must do several search iterations to find objects with optional attributes. In particular, the searching application must perform a first search for required attributes, then perform separate searches for each optional attribute.

Lastly, the Component Categories technique does not integrate well with systems that change the behavior or attributes of objects after the objects have been instantiated. In many programming environments, objects are written in a general fashion to support a set of basic methods but the manner in which they support them is dependent on their data source. For example, a text-to-speech object can be written to support the basic methods involved in converting text into speech while the sound of the voice, for example male or female, can be set by selecting a data source that contains the attributes of the voice. If one data source is used with the text-to-speech object, a male voice is heard, if a different data source is used with the same text-to-speech object a female voice is heard.

These types of systems do not work well with Component Categories because a single object listed in the Component Categories cannot have conflicting parameterizations. Taking the example above, the text-to-speech object cannot have an attribute for "gender" set to both "male" and "female".

Because of this, programmers that want to use Component Categories with such adaptable objects have had to generate different objects for each different combination of attributes. Thus, instead of creating and registering one COM object, programmers must create and register a separate COM object for each set of attributes that they want to support for the object.

SUMMARY OF THE INVENTION

The present invention provides a method and computer-readable medium for searching for programming objects on a computer system. Under one aspect of the invention, optional search attributes are used to order a list of entries that reference found programming objects. Under a second aspect of the invention, object classes that are made available dynamically or that have their attributes stored outside of a static attribute storage area are inspected during the search for programming objects. Under a third aspect of the invention, different sets of object data are allowed to reference the same object class, and different objects instantiated from a single object class may be initialized in different ways so that they exhibit different attributes.

Most embodiments of the present invention utilize two new objects to perform these functions. The first object is an object token, which is a lightweight representation of an object. The object token provides methods that allow applications to determine the attributes of objects and allow applications to instantiate objects so that they are initialized to a desired set of object data.

The second new object is a token enumerator, which searches for object attributes associated with object classes that are dynamically made available or that have their attributes located outside of a static attribute storage area. By using the token enumerator, the application does not have to know where the object, attributes, or object parameters reside and the object developer does not have to statically store the attributes or parameters of their object in the local computer. This provides many advantages including allowing the object data of objects to reside in one location in a networked environment instead of being duplicated into a large number of computers and allowing applications to search for object classes that are made available dynamically.

DETAILED DESCRIPTION OF ILLUSTRATIVE EMBODIMENTS

Figure 1:
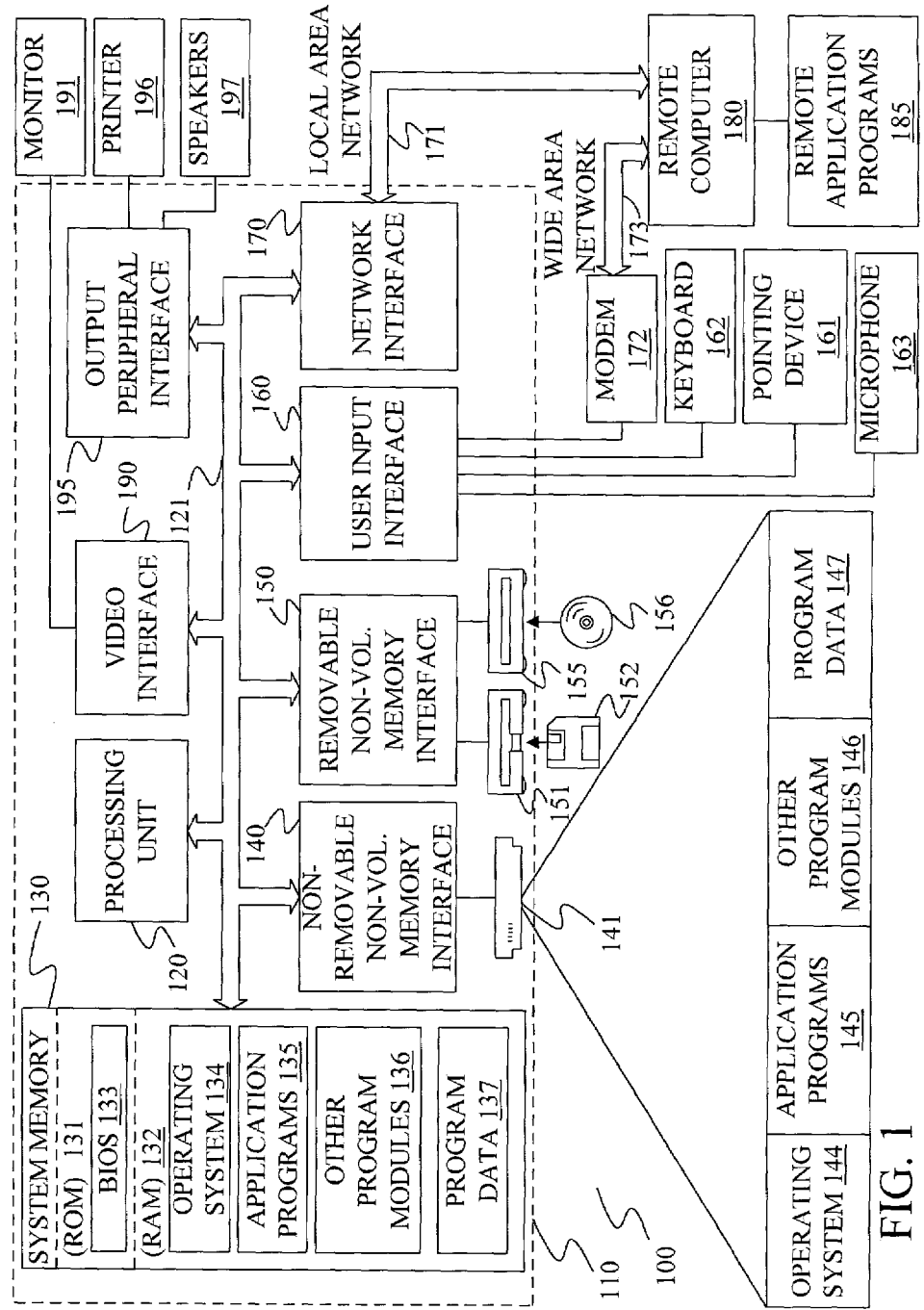
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
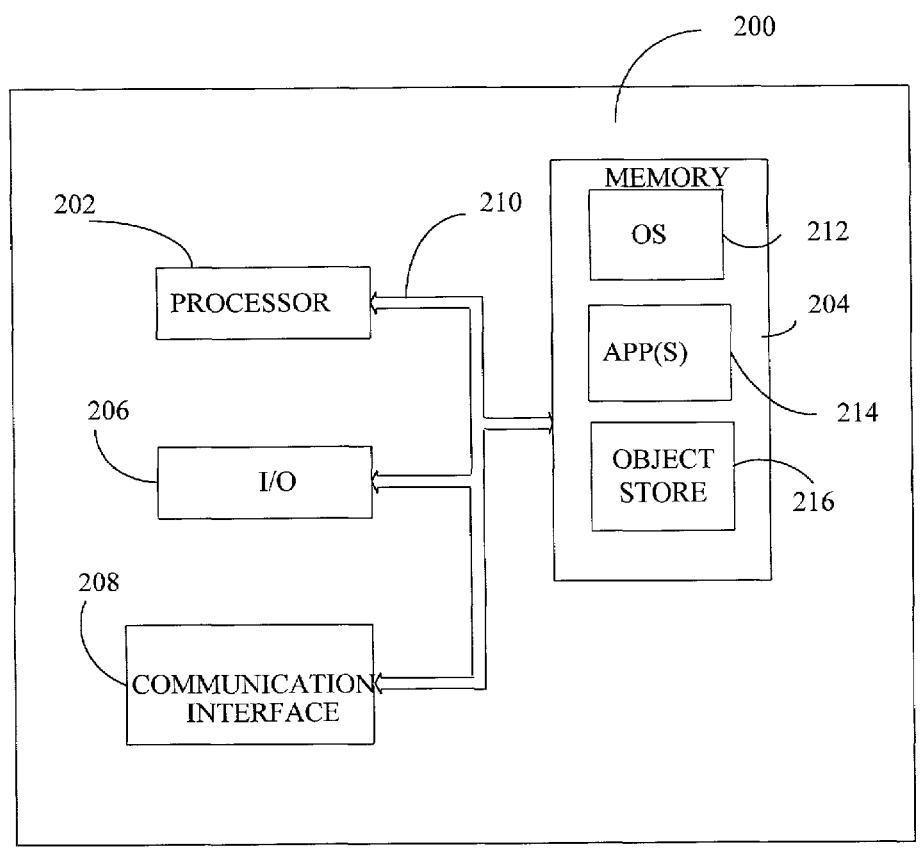
FIG. 2 is a block diagram of a mobile device in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
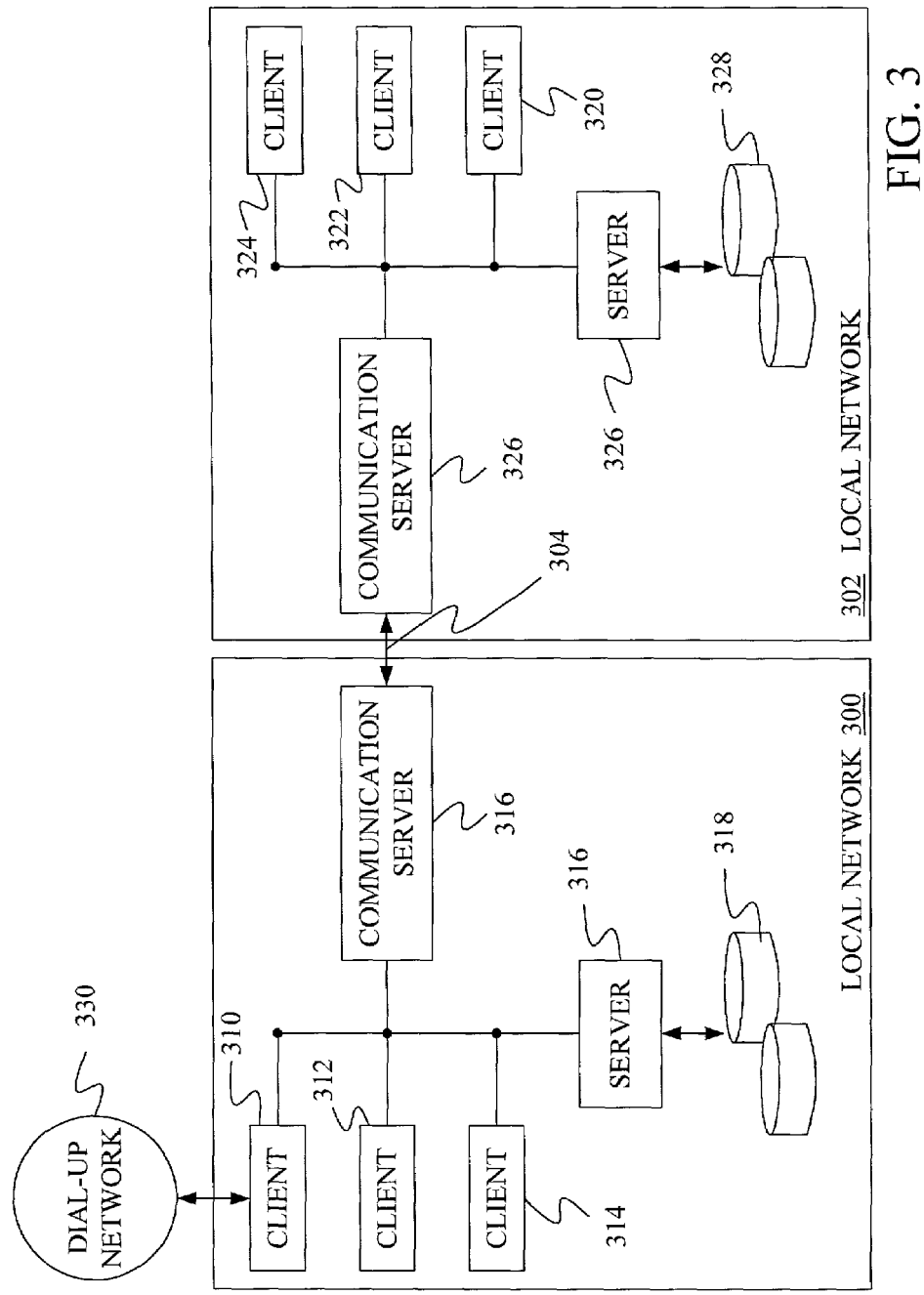
FIG. 3 is a block diagram of a network environment in which one embodiment of the present invention may be practiced.

FIG. 3 provides a block diagram of a general networking environment in which the present invention may be practiced. The networking environment includes two local area networks (LANs) 300 and 302 that are connected by a network connection 304 between two communication servers 306 and 308. LAN 300 includes a set of clients 310, 312, and 314 and a database server 316 that communicate with each other over a local area network protocol. LAN 302 includes server 326 and clients 320, 322, and 324 that also communicate with each other. The clients and server of LAN 300 are able to communicate with the clients and server of LAN 302 through communication servers 306 and 308.

Servers 316 and 326 have access to databases 318 and 328, respectively. The databases contain data and/or programming objects and can be found in a storage medium or in the active memory of the server. Each client also has access to data and programming objects that are stored on storage devices or active memory in the client.

In one embodiment, network connection 304 is an Internet connection that provides access to other servers and networks in addition to LANs 300 and 302. In other embodiments, network connection 304 is a private connection between LAN 300 and LAN 302. Each of the clients and servers of LANs 300 and 302 may also be connected to a separate dial-up network, such as network 330.

Under the present invention, a method and computer-readable medium are provided that allow applications to identify the attributes of objects without requiring the object's attributes to be present in a static attribute storage location such as the local registry or a local file. In addition, the present invention allows applications to designate optional attributes for the object when making a single search call. Under one embodiment, these optional attributes are used to organize a list of found objects so that objects that contain the optional attributes appear in the list in a priority order based on which optional attributes are matched.

Figure 4:
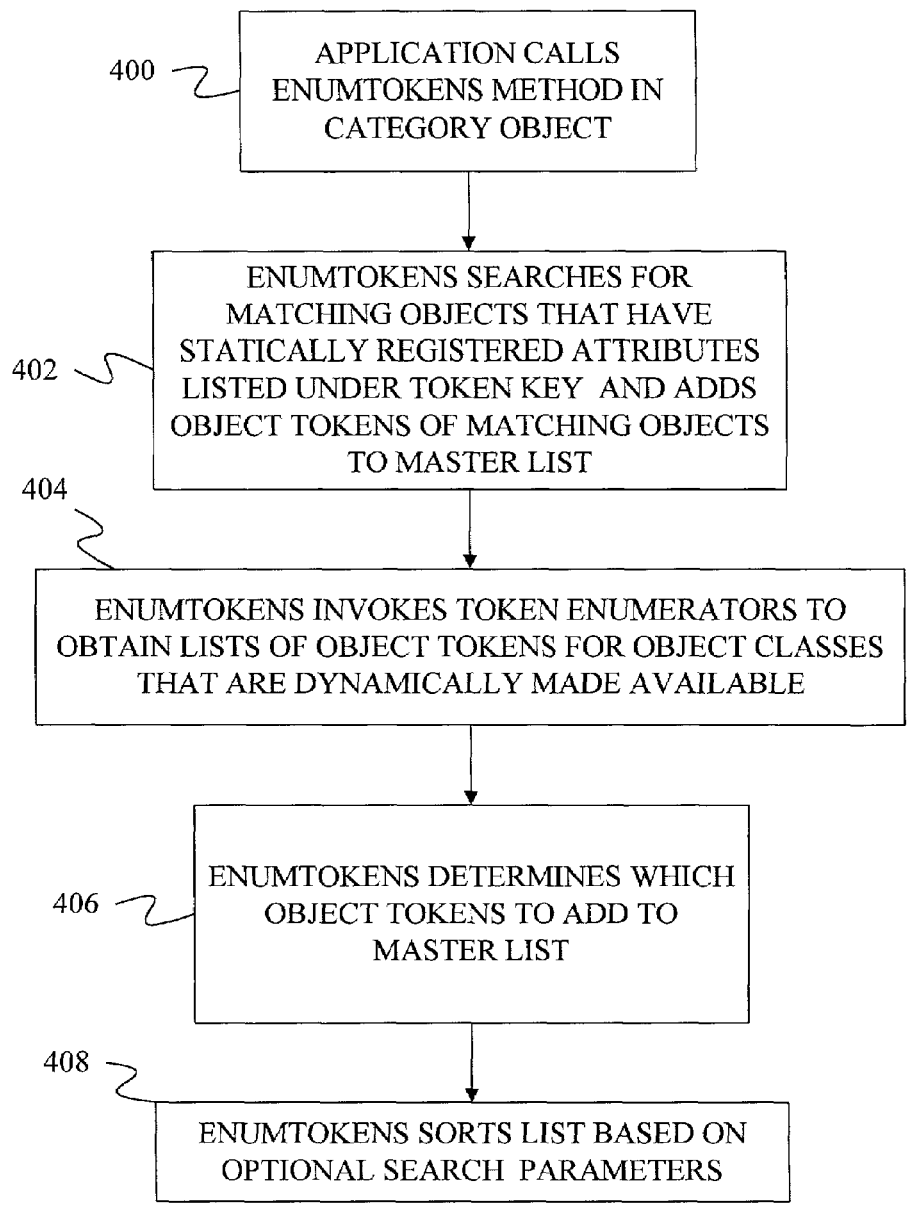
FIG. 4 is a flow diagram of a method of searching for object attributes under one embodiment of the present invention.

FIG. 4 provides a flow diagram of a method of searching for objects with certain attributes under the present invention. The method is described below with reference to the block diagram of FIG. 5, which shows the various objects involved in the search.

In step 400 of FIG. 4, an application 500 calls a method named "EnumTokens", which is exposed by a category object 502. Under most embodiments, when the application calls the EnumTokens method, it passes a list of required attributes and a list of optional attributes to the method. Thus, with a single call, the application is able to specify both required attributes and optional attributes that it wants in an object.

Figure 5:
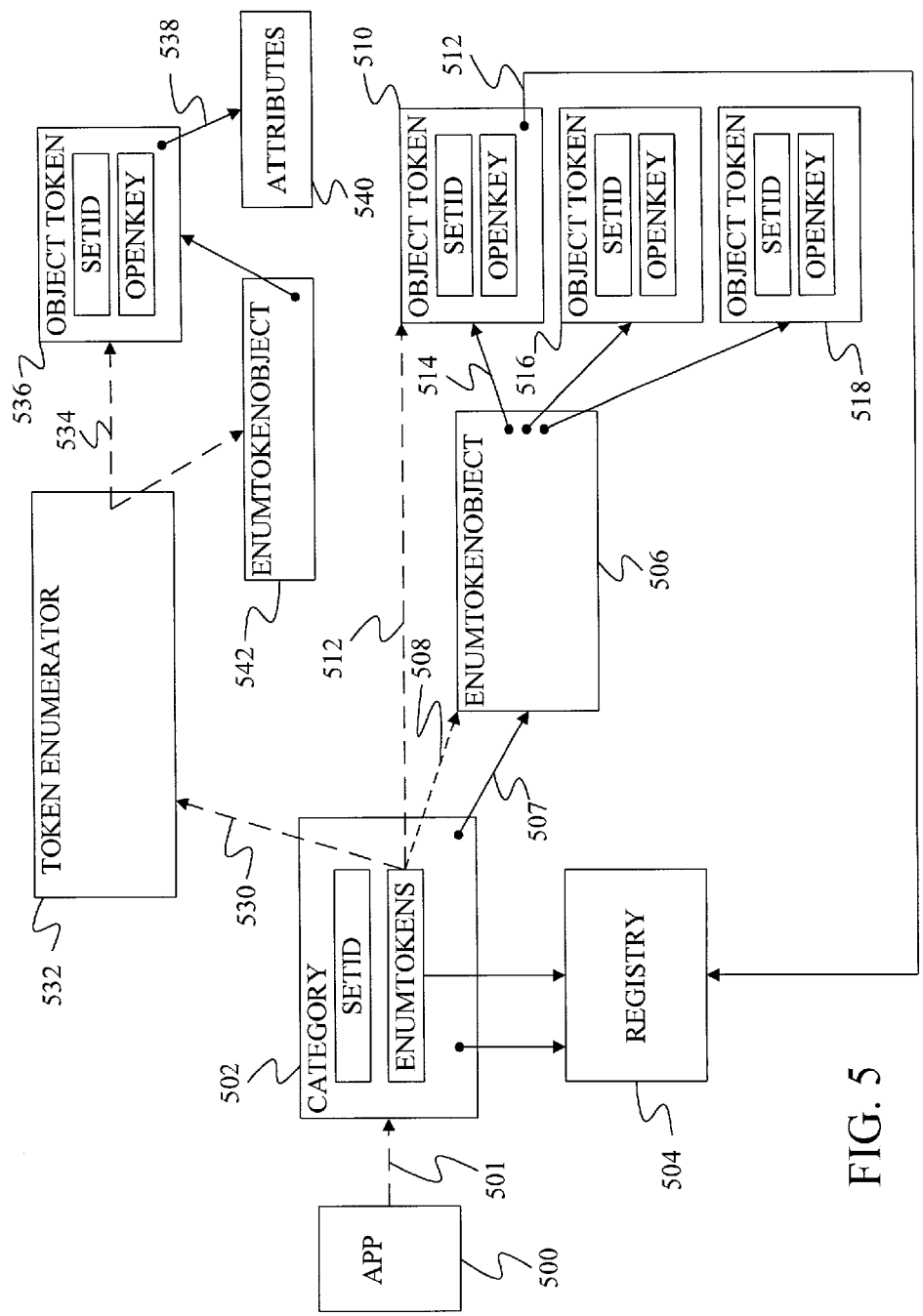
FIG. 5 is a diagram of objects used in the method of FIG. 4.
Figure 6:
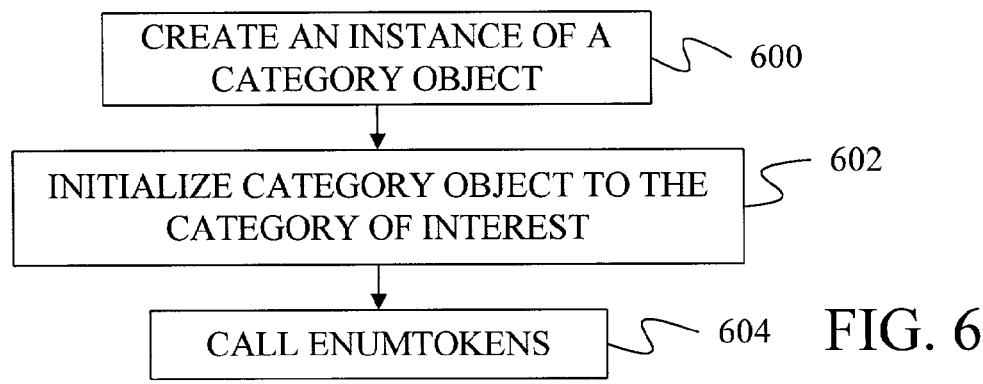
FIG. 6 is a flow diagram of step 400 of FIG. 4.

Implicit in step 400 are the steps of FIG. 6. In particular, before calling EnumTokens, application 500 instantiates category object 502 at step 600. (The process of instantiating an object is shown by a dotted line in FIG. 5, such as insantiation line 501). The resulting category object exposes interfaces that include at least the EnumTokens method and a SetId method. At step 602, application 500 calls the SetId method to initialize category object 502 so that it points to a category path in the local registry, shown as registry 504 in FIG. 5. For example, in a speech recognition embodiment, category object 502 could be initialized to a "voices" category by setting it to point to a registry path of:
"HKEY_LOCAL_MACHINE\SOFTWARE\Microsoft\Speech\Voices"

Once category object 502 has been initialized, application 500 calls the EnumTokens method as shown by step 604 of FIG. 6.

At step 402 of FIG. 4, EnumTokens searches for objects that match the search criteria it received. The result of this search is a list of pointers to a set of specialized objects that the present inventors call object tokens. Under the present invention, an object token is a small object that can be used to access the attributes of another larger object. In general, there is one object token for each object of interest. Thus, in step 402, there is one object token for each object that has attributes that match the required attributes provided to EnumTokens.

Figure 7:
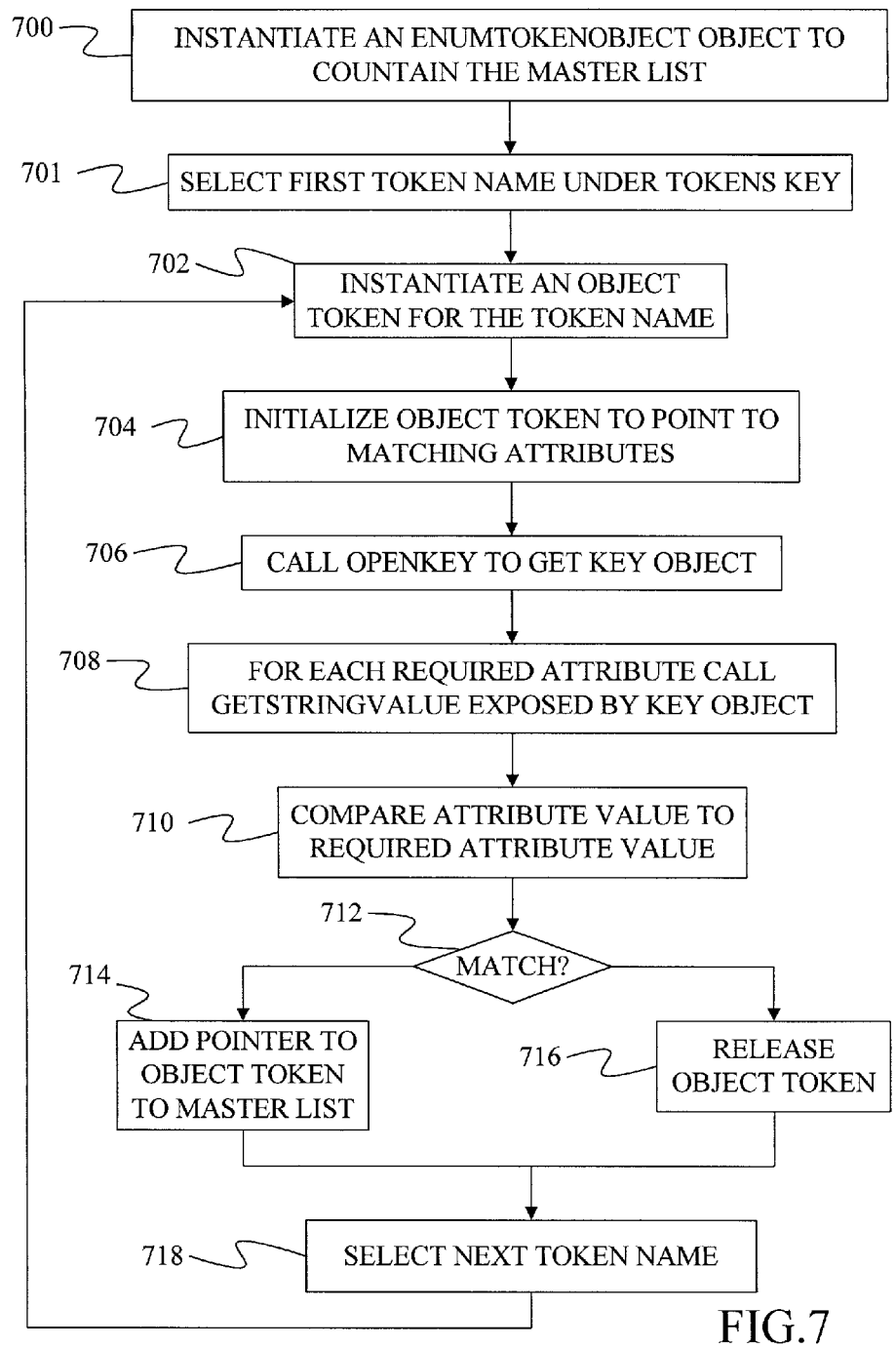
FIG. 7 is a flow diagram of step 402 of FIG. 4.

The details of step 402 are shown in the flow diagram of FIG. 7. In step 700, EnumTokens instantiates an EnumTokenObject object 506, as shown by instantiation line 508 of FIG. 5. EnumTokenObject 506 is a standard COM enumerator that maintains a list of entries and exposes methods to organize and retrieve those entries. After EnumTokenObject 506 has been instantiated, EnumTokens is returned a pointer 507 to an interface on EnumTokenObject 506 that exposes the methods for organizing and retrieving entries in the list.

At step 702, EnumTokens accesses registry 504 using the category path for Category object 502. Beneath this category path, EnumTokens looks for the registry key "Tokens", which contains object data for objects that fit within the category associated with Category object 502. An example of the content of the Tokens registry key is shown in FIG. 8.

Figure 8:
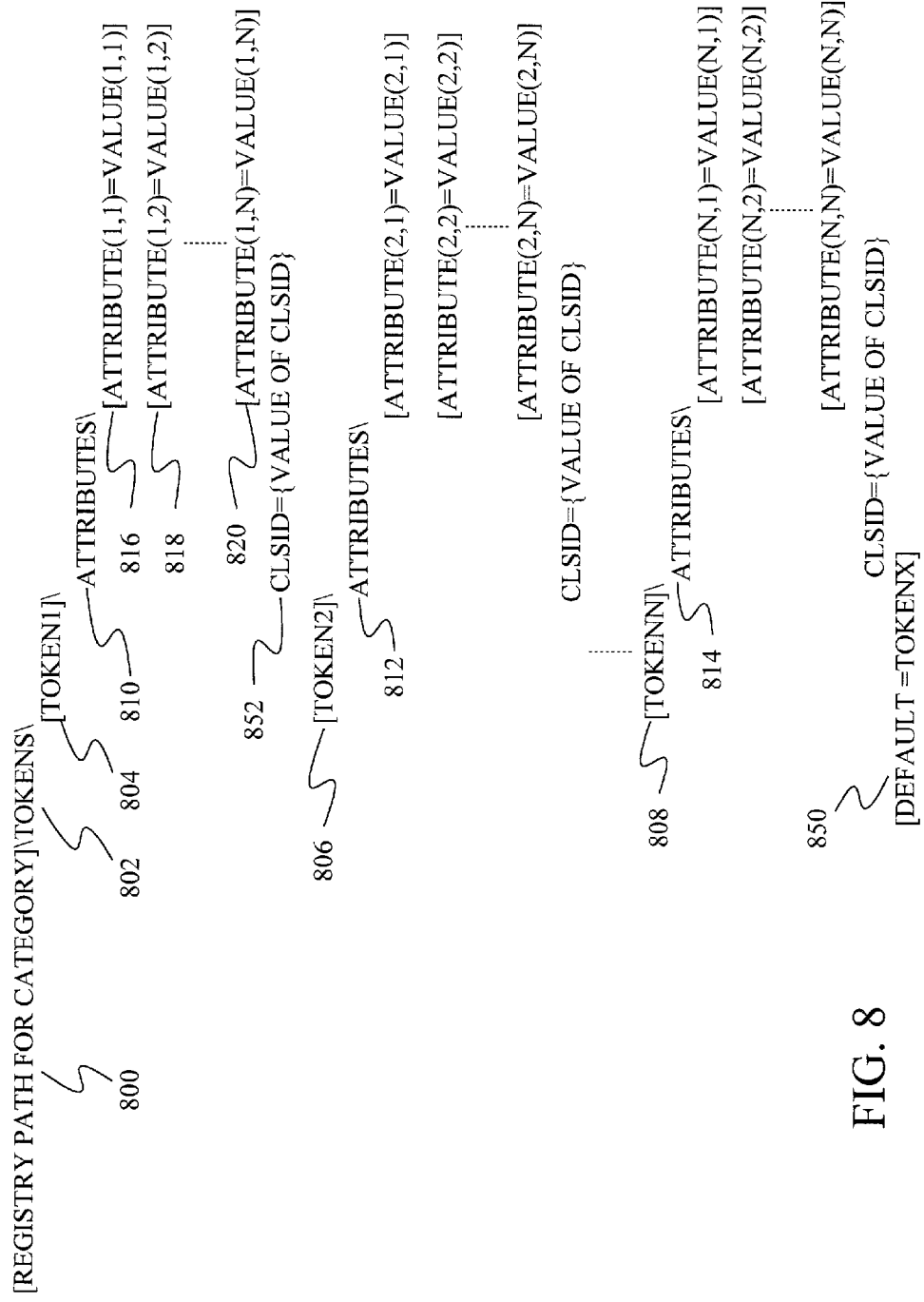
FIG. 8 is a diagram of a registry layout for a Tokens key under one embodiment of the present invention.

In FIG. 8, the Tokens key is defined by a category path 800 and the "Tokens" keyword 802. The next level below "Tokens" keyword 802 contains token names such as token names 804, 806, and 808. For example, in a text-to-speech embodiment, token names under the voices category can include MSMary and MSSam, which are the names of text-to-speech voices that can be used when generating a speech signal. Each token name represents a separate object under the category.

Beneath each token name is a collection of object data, some of which is placed beneath an "Attributes" key such as Attributes keys 810, 812, and 814. Beneath each Attributes key is a list of searchable attributes and attribute values for the object represented by the token name. For example, Attributes key 810 contains attribute/attribute value pairs 816, 818, and 820.

At step 701, EnumTokens selects the first token name under the tokens key and at step 702, instantiates an object token for that token name. For example, in FIG. 5, object token 510 is instantiated. After object token 510 has been instantiated, a pointer to an interface on object token 510 is returned to EnumTokens. (The pointer is not shown in FIG. 5 for simplicity.) Using the pointer, EnumTokens calls a SetId method exposed by the object token's interface to initialize the object token at step 704. In particular, the SetId method is used to set a pointer in object token 510 so that the object token points to the registry token name. This is shown in FIG. 5 by pointer 512.

Once the object token has been initialized, EnumTokens calls an OpenKey method exposed by the object token at step 706. This method instantiates a data key object (not shown for simplicity), which supports a method known as GetStringValue for accessing the data under the token name in the registry.

At step 708, EnumTokens calls GetStringValue once for each required attribute. For each call, GetStringValue returns the value associated with the attribute name. At step 710, the returned attribute values are compared to the required values and if all of the required attributes match at step 712, a pointer to the object token is added to the master list controlled by EnumTokenObject 506. If one or more of the returned attributes do not match the required attributes at step 712, the object token is released at step 716.

After either step 714 or step 716, the next token name under the Tokens key is selected at step 718 and the process of FIG. 7 returns to step 702. The steps of FIG. 7 are then repeated for each token name under the Tokens key.

After the last token name's attributes have been searched in the process of FIG. 7, the process of FIG. 4 continues at step 404, where EnumTokens searches for objects that do not have object data listed under the Tokens key in the registry. To do this, EnumTokens utilizes a specialized object that the present inventors call a token enumerator.

Figure 9:
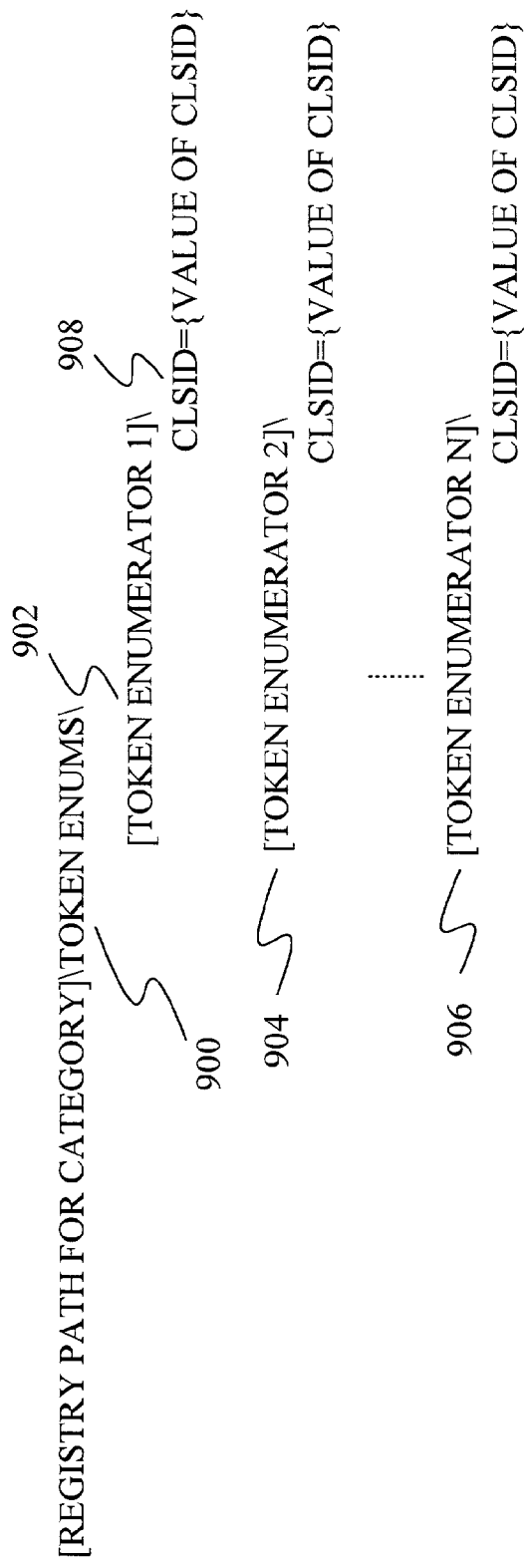
FIG. 9 is a diagram of a registry layout for a Token Enums key under one embodiment of the present invention.

Each category may have any number of token enumerators associated with it. The token enumerators for a category are listed under a "Token Enums" key in the registry path for the category. An example of the contents of a Token Enums key 900 is shown in FIG. 9.

In the registry, the names of the token enumerators are listed as individual registry keys directly beneath the Token Enums key. For example, in FIG. 9, token enumerator names 902, 904 and 906 appear as individual keys beneath Token Enums key 900. Each token enumerator key has a data entry, such as data entry 908, that is denoted by the data name CLSID. The value in this data entry provides a unique Class Identifier for the token enumerator's programming object, which can be used to instantiate the token enumerator.

As mentioned above, in step 404, EnumTokens uses the token enumerators to search for objects that do not have their attributes listed in a static attribute storage location such as under the Tokens key in the registry or some other relatively static file or memory location. Thus, the token enumerator is used to find attributes for object classes that are dynamically made available. Such dynamic object classes include object classes that have an accessibility that is subject to change because the object class is located on a remote machine that may or may not be connected to the local computer or because the object class is loaded into the local computer only when the proper conditions exist for the object class. The process of step 404 is shown in more detail in the flow diagram of FIG. 10.

Figure 10:
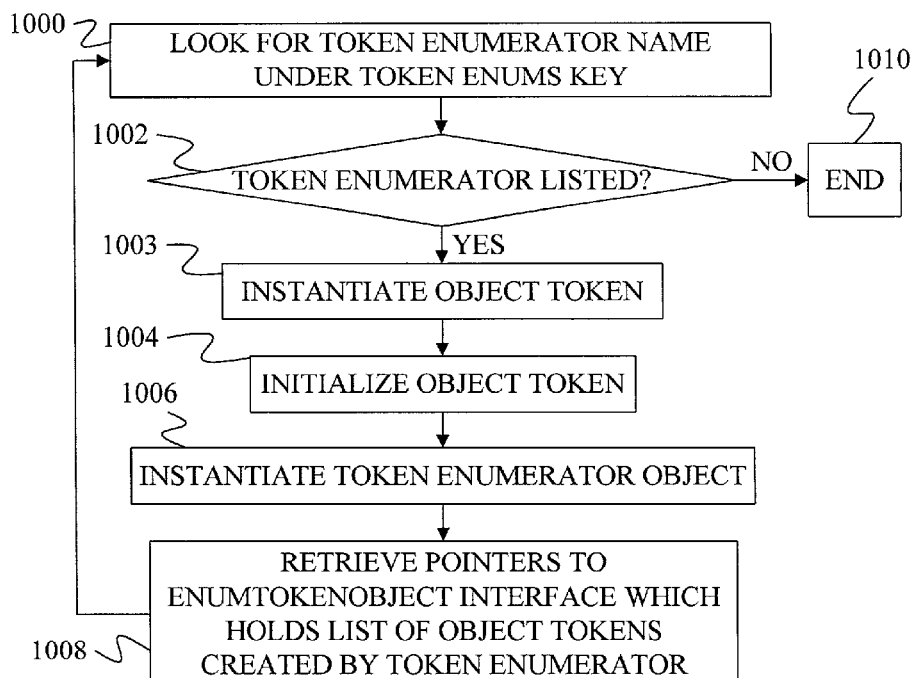
FIG. 10 is a flow diagram of step 404 of FIG. 4.

At step 1000 of FIG. 10, EnumTokens looks for the first token enumerator name under the Token Enums key. If there is a token enumerator name at step 1002, EnumTokens instantiates an object token for the token enumerator at step 1003 and initializes the object token to point to the object data for the token enumerator at step 1004. EnumTokens then instantiates the token enumerator through the object token at step 1006. This instantiation is shown in FIG. 5 by instantiation line 530, which runs from EnumTokens to a token enumerator 532.

At step 1008, after the token enumerator is instantiated, EnumTokens retrieves a pointer to a EnumTokenObject interface, which provides access to a list of object tokens created by the token enumerator. The steps performed by the token enumerator to form this list are shown in FIG. 11.

Figure 11:
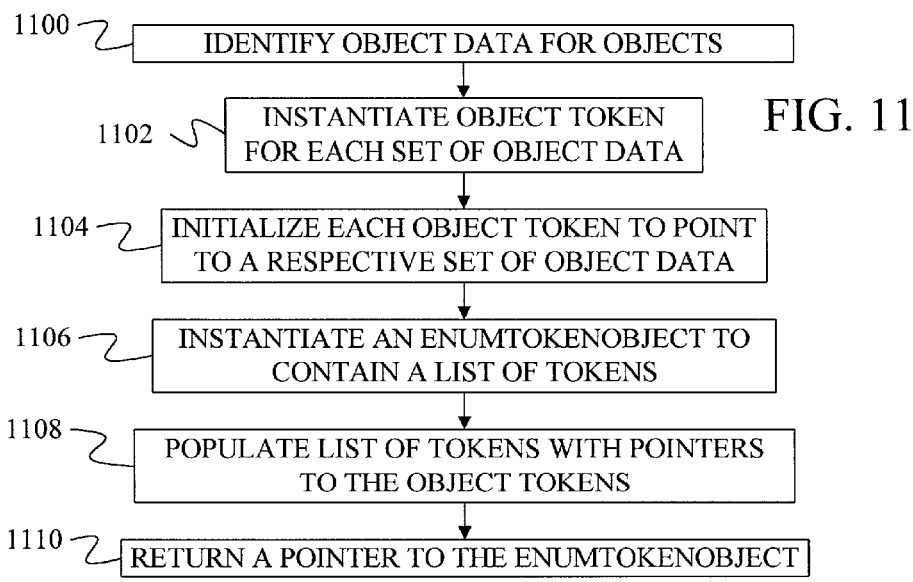
FIG. 11 is a flow diagram of the steps performed by the token enumerator to generate its list of object tokens.

In step 1100 of FIG. 11, the token enumerator identifies objects that fall within the category and the location of the object data for those objects. Note that each token enumerator may use different techniques to identify the objects that fall within the category. As a result, different token enumerators may identify different objects and/or different locations for the object data of those objects. For example one token enumerator may look in a remote network database for object data while another token enumerator may look in a file on the local machine for object data. In some embodiments, a token enumerator checks to see what hardware devices are connected to a local machine and then selects particular objects from a list of possible objects based on the available hardware. Those skilled in the art will recognize that additional techniques may also be used.

After the objects and the corresponding object data have been identified, the process of FIG. 11 continues at step 1102 where the token enumerator instantiates an Object Token for each set of identified attributes. This instantiation is shown as instantiation line 534 between token enumerator 532 and object token 536. With each instantiation, token enumerator 532 receives a pointer to an interface on the instantiated object token.

At step 1104, the token enumerator initializes each object token so that it points to the location of the object token's object data. Note that each object token will point to a different location since each object token is associated with a different set of object data. To initialize each object token, token enumerator 532 uses the pointer to the token's interface to call a SetId method exposed by the object token. The results of this initialization is a pointer 538 between the object token 536 and the object data 540 of the object represented by the object token.

At step 1106, the token enumerator instantiates EnumTokenObject 542, which is a standard COM enumerator. At step 1108, the token enumerator calls methods exposed by EnumTokenObject 542 to create a list of pointers that includes a separate pointer for each of the object tokens instantiated in step 1102. When all of the object tokens have had their pointers added to the list, the token enumerator returns a pointer that points to EnumTokenObject 542 at step 1110. This pointer is returned to EnumTokens of Category object 502, thereby marking the end of step 1008 of FIG. 10.

After step 1008, the searching process of FIG. 10, which involves searching for objects that do not have their object data statically listed under the Tokens key, continues by repeating steps 1000 and 1002. If there are more token enumerators listed at step 1002, the next token enumerator is selected and steps 1003, 1004, 1006 and 1008 are repeated. If there are no more token enumerators listed, the process of FIG. 10 ends at step 1010, thereby marking the end of step 404 of FIG. 4.

After step 404, the process of searching for objects that have certain attributes continues at step 406 where EnumTokens determines which object tokens identified in step 404 should be added to the list maintained by EnumTokenObject 506. Under most embodiments, the token enumerator does not determine whether objects meet the required search criteria. As a result, some of the object tokens in the list returned by the token enumerator do not meet the search criteria.

Figure 12:
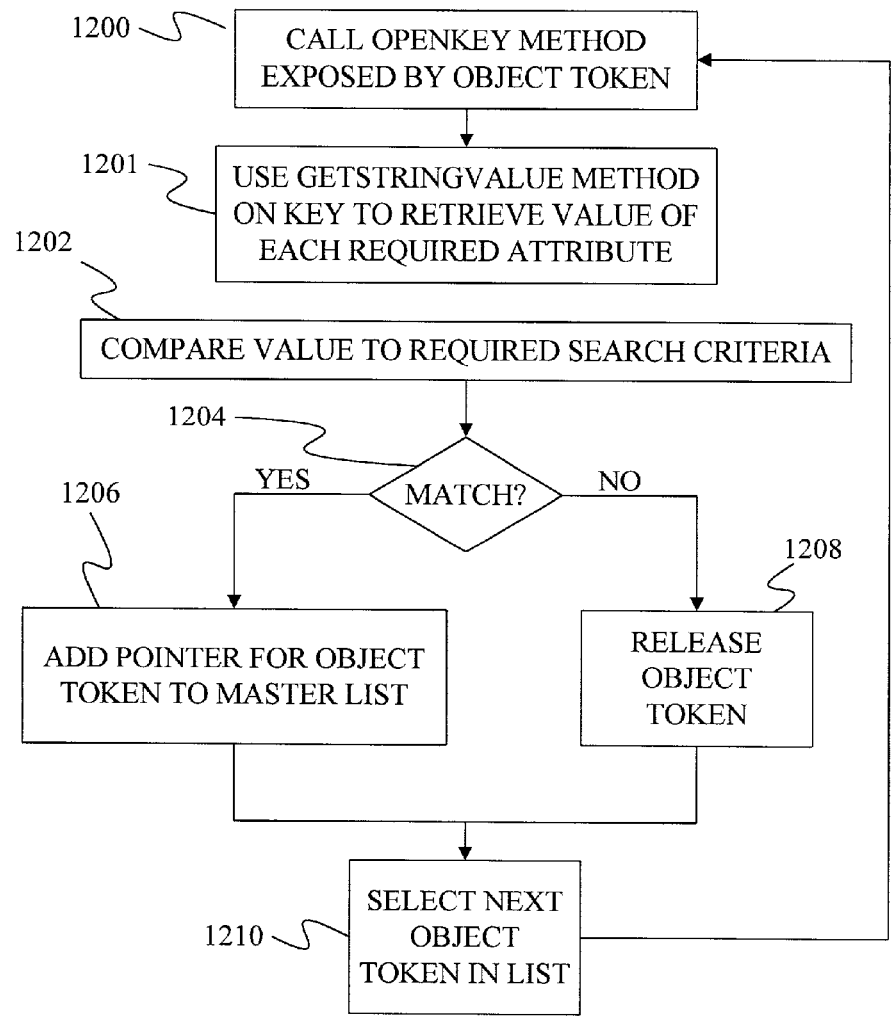
FIG. 12 is a flow diagram of step 406 of FIG. 4.

To determine which of these object tokens to add to the master list maintained by EnumTokenObject 506, EnumTokens uses a process described in the flow diagram of FIG. 12. In step 1200 of FIG. 12, EnumTokens accesses the first object token pointer in the list provided by EnumTokenObject 542 and calls the OpenKey method exposed by the object token. This method generates a Data Key object (not shown for simplicity) that supports the GetStringValue method. This method is then used at step 1201 to retrieve attributes from the object data pointed to by the accessed objected token. In the GetStringValue call, EnumTokens includes the attribute values that it wants returned and GetStringValue returns a pointer to a string containing the requested values.

At step 1202, EnumTokens compares the returned attribute values to the required search criteria. If the attribute values for the object match all of the required search criteria at step 1204, the pointer to the object token in EnumTokenObject 542 is added to the master list in EnumTokenObject 506 at step 1206.

If the returned attributes do not match the required search criteria at step 1204, the process of FIG. 12 continues at step 1208 where the pointer to the object token is released.

After either step 1206 or step 1208, EnumTokens continues at step 1210 where it selects the next object token pointer in EnumTokenObject 542. EnumTokens then repeats steps 1200, 1202, 1204, 1206, and 1208 for the new object token pointer.

Note that each token enumerator instantiates a separate instance of an EnumTokenObject and that each instance contains a separate list of object token pointers. Thus, the process of FIG. 12 must be repeated for each EnumTokenObject that was returned to EnumTokens.

Once the process of FIG. 12 has been performed for each of the EnumTokenObject lists, the master list contains pointers for all of the object tokens that meet the required search criteria.

Once the master list has been populated, the object tokens in the list are ordered at step 408 based on the optional attributes listed for the objects.

To order the list, the optional attributes are first assigned a bit location in a bit string generated for each object token. The lowest bit position in the bit string is a flag that indicates whether the current object token is associated with a default object for the category. The bit positions above the lowest bit are assigned to the optional attributes based on the order of the attributes in the search request. The second to lowest bit position is associated with the last optional attribute specified in the search request, the next bit position is associated with the next to last optional attribute and so forth ending with the highest bit position being associated with the first optional attribute in the search request.

For each object token, the GetStringValue method is used to retrieve the value of each optional attribute. If the retrieved value matches the optional attribute value, the corresponding bit in the bit string is set to "1". If the values do not match, the bit is set to "0". When all of the object tokens have had their bit strings set, the list is ordered based on the values of the bit strings. Thus, an object token that has all of the optional parameters will be first in the list.

Note that because the default object is the lowest bit, the default object will always appear in the list before objects that have similar optional attributes. Thus, if two objects have the second and third optional attributes and one of the objects is the default object, the default object will appear before the other object in the list.

Note that the ordering described above is only one example of the way in which the pointers may be ordered based on the optional attributes. Other ordering techniques may be used. For instance, the pointers may be organized based on how many optional attributes each object matches, without regard to the particular optional attributes that are matched. Thus, an object that matches two optional attributes would always appear before an object that only matched one optional attribute.

By organizing the list of object token pointers based on the optional attributes, the present invention provides an easy means for applications to find objects that contain optional attributes.

After the list has been ordered based on the optional attributes, a pointer to EnumTokenObject 506 is returned to Application 500.

In the description above, EnumManagedTokens did not compare the attributes of the object tokens to the search criteria before adding the object tokens to EnumTokenObject 542. In other embodiments, the token enumerator uses the GetStringValue method exposed by each object token to retrieve the object's attributes so that they can be compared with the required search attributes. Under this embodiment, only those objects that match the required search attributes are added to the list contained in EnumTokenObject 542.

Note that during the search process, the objects associated with the object tokens were never instantiated. Thus, the present invention is able to indicate whether an object meets a set of search criteria without instantiating the object itself. Also note that the present invention is able to locate attributes of objects that are not found statically in the local registry. Thus, under the present invention, an object class may be made available dynamically or the attributes of an object may be stored on a remote server and may be accessed by a local token enumerator without instantiating the object and without requiring that the attributes of the object be added to the local registry.

Under one embodiment, the attributes of objects can be placed in a Markup Language document on an Internet server. The token enumerator then initializes the object token with the Internet address of the document. When EnumTokens asks the object token for an attribute value, the object token requests the document by sending an appropriate Internet request. It then parses the document into a string and provides a pointer to the string to EnumTokens.

Under some embodiments of the present invention, object tokens can also be used to initialize an object to a particular set of attributes during instantiation of the object. A method for performing such initialization under one embodiment of the present invention is shown in the flow diagram of FIG. 13, which is described below with reference to the block diagram of FIG. 14.

Figure 13:
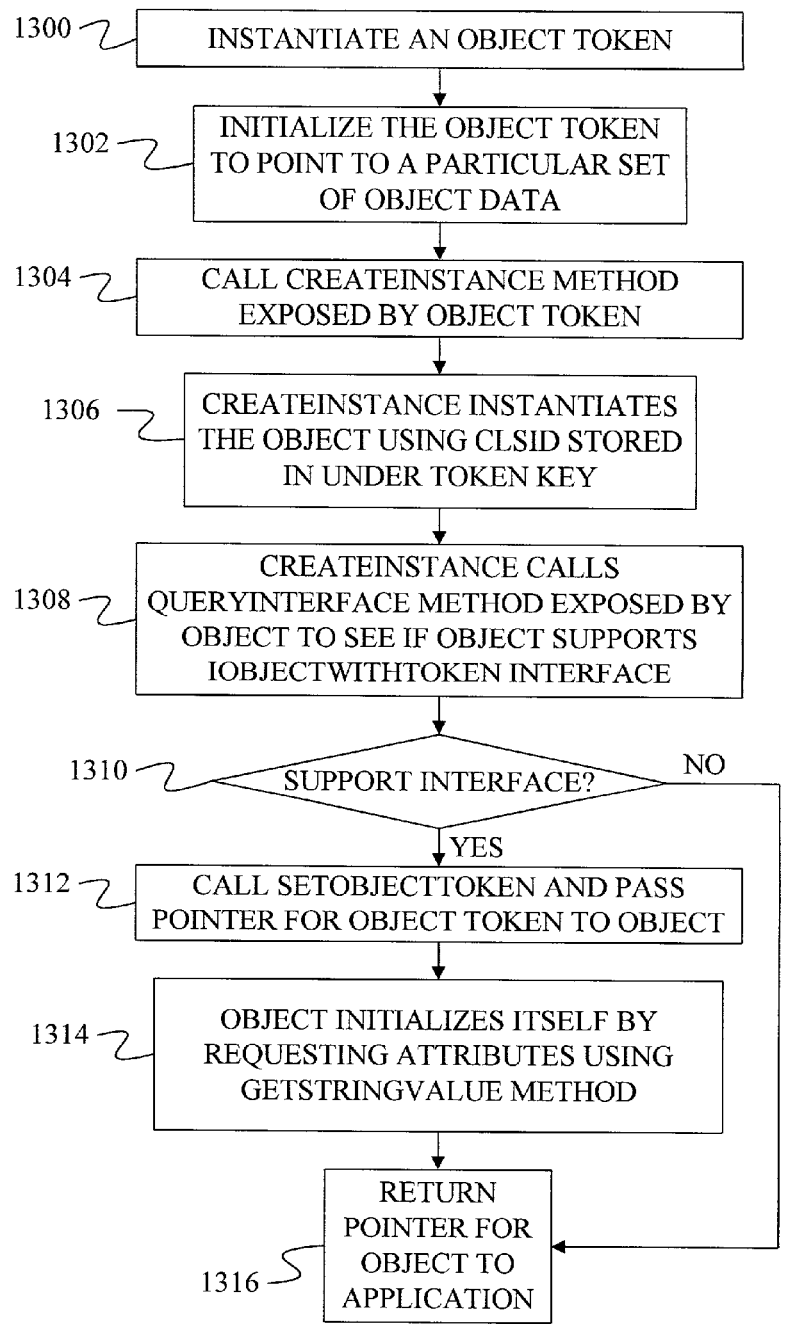
FIG. 13 is a flow diagram of a method of instantiating and initializing objects under one embodiment of the present invention.
Figure 14:
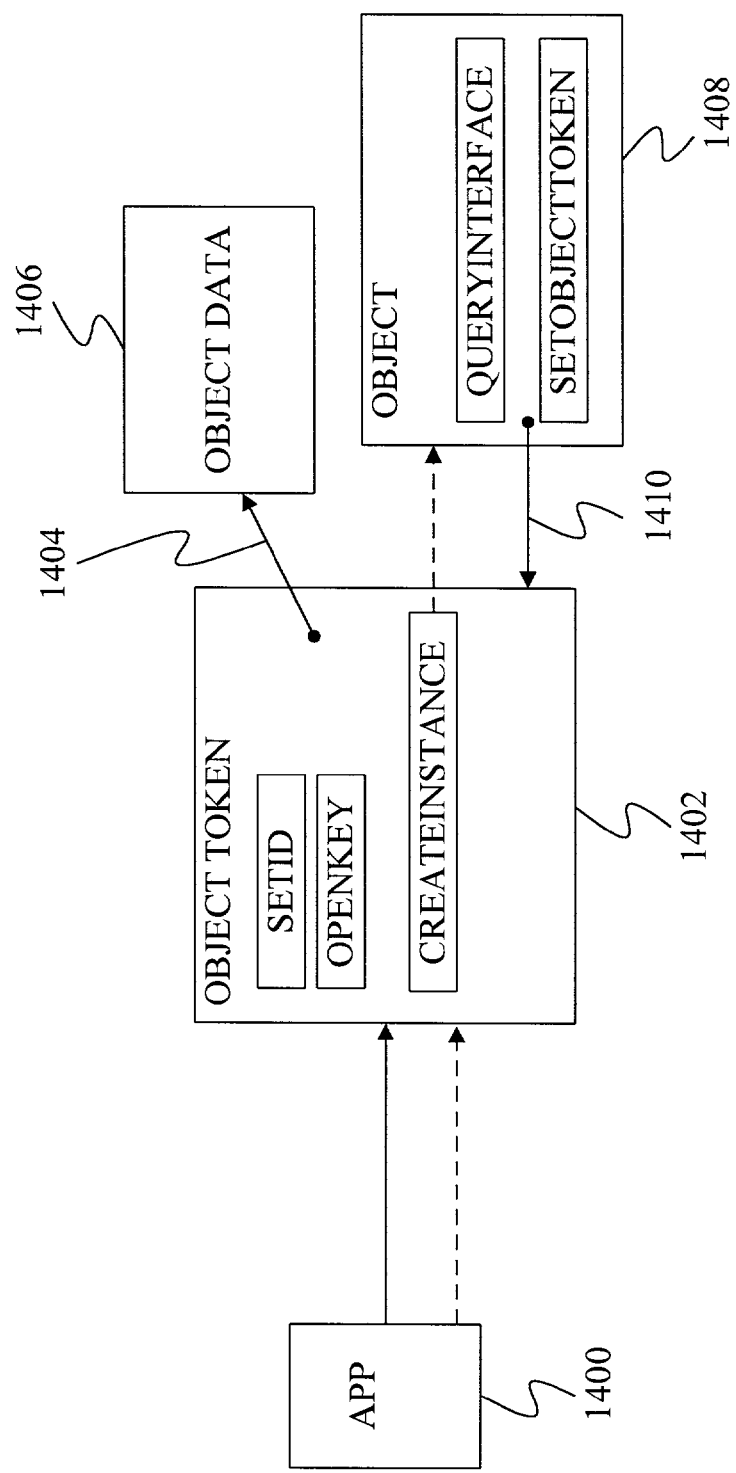
FIG. 14 is a diagram of objects used with the method of FIG. 13.

In step 1300 of FIG. 13, an application 1400 instantiates an object token 1402 using a call to the standard COM method CoCreateInstance. At step 1302, application 1400 initializes object token 1402 by calling the SetId method in object token 1402 so that object token 1402 has a pointer 1404 to a set of object data 1406. The object data includes the Class Identifier of the object to be instantiated as well as initialization values that the object will use to initialize itself.

At step 1304, application 1400 calls a CreateInstance method exposed by object token 1402. This method retrieves the Class Identifier of the object to be instantiated from attributes 1406. It then calls CoCreateInstance to instantiate an object 1408 at step 1306.

Once object 1408 is instantiated, CreateInstance calls the QueryInterface method exposed by object 1408 at step 1308. It then uses the results of this method to see if object 1408 supports the IObjectWithToken interface at step 1310.

If object 1408 supports the interface, CreateInstance calls the SetObjectToken method in the IObjectWithToken interface at step 1312. As part of the call to SetObjectToken, CreateInstance passes a pointer 1410 to the object token's interface. Using this pointer, SetObjectToken initializes the object in step 1314 by requesting attributes for the object using the GetStringValue method exposed indirectly by object token 1402. For example, the attributes can include a file location for a data file from which the object can be initialized. After it has retrieved the initialization information using the GetStringValue method, object 1408 initializes itself using the information.

After step 1314 or if the object does not support the IObjectWithToken interface at step 1310, the process of FIG. 13 ends at step 1316 by returning a pointer that points to the object.

Note that using the method of FIG. 13, embodiments of the present invention allow different object data to be associated with the same object class. Thus, two different sets of object data could contain the same Class Identifier for the same object class. Thus, developers can assign different attributes to the same object while only registering the object class once. This is a substantial improvement over the prior art in which developers had to register different versions of the object class if they wanted to associate different sets of object data to the object class.

Although the present invention has been described with reference to particular embodiments, workers skilled in the art will recognize that changes may be made in form and detail without departing from the spirit and scope of the invention.

What is claimed is:

1. A method of instantiating and initializing a programming object, the method comprising:
   selecting an object data set for an object from a plurality of object data sets for the object's class, each object data set including the same unique identifier for the object's class, where only objects of the object's class can be instantiated using the unique identifier, wherein selecting an object data set comprises:
   locating the object data set;
   instantiating an object token separate from the object; and
   initializing the object token to point to the object data set;
   instantiating the object based on the unique identifier; and
   initializing the object using at least one attribute in the selected object data set.

2. The method of claim 1 wherein instantiating the object comprises calling an instantiation method exposed by the object token.

3. The method of claim 2 wherein initializing the object comprises having the instantiation method of the object token call an initialization method exposed by the object to set a pointer to the object token in the object.

4. The method of claim 3 wherein initializing the object further comprises having the initialization method in the object access attributes through the pointer to the object token and having the initialization method use at least one accessed attribute to initialize the object.

5. A tangible computer-readable medium having a computer-loadable data structure, the data structure comprising:

a first set of object data for an object class wherein the first set of object data comprises a first entry containing a unique identifier for the object class that must be known in order to instantiate an instance of the object and at least one attribute of the object class; and a second set of object data for the object class wherein the second set of object data comprises a second entry containing the same unique identifier for the object class as the first entry and at least one attribute of the object class that is different from the at least one attribute of the first set of object data.

6. The tangible computer-readable medium of claim 5 wherein one of the attributes is a data file for initializing the object.

7. The tangible computer-readable medium of claim 5 wherein the first set of object data is located on a first computer and the second set of object data is located on a second computer.

8. The tangible computer-readable medium of claim 5 wherein the first set of object data and the second set of object data are both found in a registry in a local computer.

9. The tangible computer-readable medium claim 8 wherein the first and second sets of object data are both found under a Tokens key.

10. A tangible computer-readable medium having a computer-loadable object token comprising:

computer-executable instructions for setting the object token to point to a set of object data related to an object;

computer-executable instructions for retrieving attributes from the set of object data;

computer-executable instructions for instantiating the object based on a unique identifier in the set of object data; and computer-executable instructions for passing a pointer to the object token to the object.

11. The tangible computer-readable medium of claim 10 wherein the computer-loadable object token further comprises computer-executable instructions to cause an instantiated object to initialize itself by passing requests to the object token to retrieve attributes from the set of object data.

12. A tangible computer-readable medium having a computer-loadable token enumerator comprising:

computer-executable instructions for locating object attributes for an object that are located outside of a static attribute storage location;

computer-executable instructions for instantiating an object token;

computer-executable instructions for initializing the object token to point to the object attributes; and computer-executable instructions to provide to an instance of the object a pointer to the instantiated object token as reference to the object attributes.

* * * * *

UNITED STATES PATENT AND TRADEMARK OFFICE
CERTIFICATE OF CORRECTION

| | | |
|---|---|---|
| PATENT NO. | : 7,099,886 B2 | Page 1 of 1 |
| APPLICATION NO. | : 09/871550 | |
| DATED | : August 29, 2006 | |
| INVENTOR(S) | : Ralph Lipe et al. | |

It is certified that error appears in the above-identified patent and that said Letters Patent is hereby corrected as shown below:

In column 7, line 25, delete "insantiation" and insert -- instantiation --, therefor.

In column 13, line 26, in Claim 9, after "medium" insert -- of --.

Signed and Sealed this

Thirtieth Day of March, 2010

David J. Kappos
*Director of the United States Patent and Trademark Office*